US010358555B2

(12) United States Patent
Fernagut et al.

(10) Patent No.: US 10,358,555 B2
(45) Date of Patent: Jul. 23, 2019

(54) COMPOSITIONS OF POLYAMIDE AND PEBA FOR THE INJECTION OF FATIGUE-RESISTANT RIGID PARTS

(71) Applicant: ARKEMA FRANCE, Colombes (FR)

(72) Inventors: François Fernagut, Menneval (FR); René-Paul Eustache, Combon (FR); Mathieu Sabard, Serquigny (FR); Yves Deyrail, Aviron (FR)

(73) Assignee: ARKEMA FRANCE, Colombes (FR)

( * ) Notice: Subject to any disclaimer, the term of this patent is extended or adjusted under 35 U.S.C. 154(b) by 87 days.

(21) Appl. No.: 15/127,607

(22) PCT Filed: Mar. 23, 2015

(86) PCT No.: PCT/FR2015/050721
§ 371 (c)(1),
(2) Date: Sep. 20, 2016

(87) PCT Pub. No.: WO2015/150662
PCT Pub. Date: Oct. 8, 2015

(65) Prior Publication Data
US 2018/0171140 A1 Jun. 21, 2018

(30) Foreign Application Priority Data

Mar. 31, 2014 (FR) ...................... 14 52791

(51) Int. Cl.
A43B 5/04 (2006.01)
C08L 77/00 (2006.01)
C08L 77/02 (2006.01)
C08L 77/06 (2006.01)

(52) U.S. Cl.
CPC ............ *C08L 77/02* (2013.01); *A43B 5/0482* (2013.01); *C08L 77/00* (2013.01); *C08L 77/06* (2013.01); *C08L 2201/08* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,218,549 A | 8/1980 | Jadamus et al. | |
| 5,140,065 A | 8/1992 | Dalla Torre et al. | |
| 5,153,275 A | 10/1992 | Chacko et al. | |
| 5,883,195 A * | 3/1999 | Couchoud | C08L 77/00 525/167 |
| 2004/0242774 A1 | 12/2004 | Fujimura et al. | |
| 2005/0165210 A1 | 7/2005 | Malet et al. | |
| 2005/0234215 A1 | 10/2005 | Gaymans et al. | |
| 2007/0179252 A1 | 8/2007 | Lamberts et al. | |
| 2009/0208758 A1 | 8/2009 | D'Herbecourt et al. | |
| 2009/0318630 A1 | 12/2009 | Montanari et al. | |
| 2013/0172484 A1 | 7/2013 | Zhang et al. | |
| 2013/0318835 A1 | 12/2013 | Mutsuda et al. | |

FOREIGN PATENT DOCUMENTS

| | | |
|---|---|---|
| CH | 655 941 A5 | 5/1986 |
| CN | 103183960 A | 7/2013 |
| EP | 0 471 566 A1 | 2/1992 |
| EP | 1 482 011 A | 12/2004 |
| EP | 2684478 A1 | 1/2014 |
| FR | 2 592 388 A1 | 7/1987 |
| FR | 2 846 332 A1 | 4/2004 |
| JP | S59-193957 A | 11/1984 |
| JP | S60177072 A | 9/1985 |
| JP | H115898 A | 1/1999 |
| JP | 2004352789 A | 12/2004 |
| JP | 2009-079215 A | 4/2009 |
| JP | 2009540089 A | 11/2009 |
| JP | 2011110105 A | 6/2011 |
| TW | 200806709 A | 2/2008 |
| WO | WO 2007/144531 A2 | 12/2007 |

(Continued)

OTHER PUBLICATIONS

Office Action (Notification of Reasons for Refusal) dated Aug. 1, 2017, by the Japanese Patent Office in Japanese Patent Application No. 2016-559647, and an English Translation of the Office Action. (13 pages).

International Search Report (PCT/ISA/210) dated Jun. 29, 2015, by the European Patent Office as the International Searching Authority for International Application No. PCT/FR2015/050721.

Written Opinion (PCT/ISA/237) dated Jun. 29, 2015, by the European Patent Office as the International Searching Authority for International Application No. PCT/FR2015/050721.

"Cycloaliphatic Amines" (Encyclopaedia of Chemical Technology, Kirk-Othmer, 4th Edition (1992), pp. 386-405).

Smirnova N. M. et al. "Modification of polyamide 6 and polypropylene with PEBAX thermoplastic elastomers" International Polymer Science and Technology, vol. 28, No. 5, 2001, pp. T/81-T/86.

(Continued)

*Primary Examiner* — Ana L. Woodward

(74) *Attorney, Agent, or Firm* — Buchanan Ingersoll & Rooney P.C.

(57) ABSTRACT

Composition including: (A) 50% to 95% of at least one semicrystalline polyamide of formula A/Z in which: A is an aliphatic repeating unit chosen from a unit obtained from the polycondensation of at least one amino acid and a unit obtained from the polycondensation of at least one lactam or a unit X.Y obtained from the polycondensation of at least one diamine, and of at least one dicarboxylic acid, and Z represents another polyamide and is included from 0 to 20%; (B) 5% to 50% of at least one semicrystalline copolyamide comprising amide units (Ba1) and including polyether units (Ba2), having a glass transition temperature ($T_g$) below 75° C.; (C) 0% to 20% by weight of fibres and/or fillers, (D) 0% to 20% of at least one impact modifier, (E) 0% to 5% of at least one additive, for the manufacture of a sports article.

22 Claims, No Drawings

(56) References Cited

FOREIGN PATENT DOCUMENTS

WO    WO 2010/089902 A1    8/2010
WO    2012/124026 A1    9/2012

OTHER PUBLICATIONS

Notice of Opposition filed by European patent Office in European Application No. EP3126447, dated Oct. 25, 2017, (5 pages).
Opposition flied in European Application No. EP 3 126 447 B1, dated Jul. 25, 2018, (23 pages).
Smirnova N. M. et al. "Modification of polyamide 6 and polypropylene with PEBAX thermoplastic elastomers" International Polymer Science and Technology, vol. 28, No. 5, 2001, pp. T181-T186.

* cited by examiner

COMPOSITIONS OF POLYAMIDE AND PEBA FOR THE INJECTION OF FATIGUE-RESISTANT RIGID PARTS

The present invention relates to compositions of polyamides and Peba, in particular substantially devoid of transparency, used for the injection-moulding of parts which exhibit an advantageous compromise between rigidity, impact, fatigue resistance and injectability, said compositions optionally comprising the addition of inorganic fillers of glass fibre, talc or wollastonite type for the production of more rigid materials, or optionally the addition of an impact modifier for increasing the level of impact resistance.

The present invention also relates to a process for preparing said compositions and also to the objects manufactured with said compositions, such as fibres, fabrics, films, sheets, rods, tubes, injection-moulded parts, in particular sports articles, such as ski boots or a part of a ski boot or a rigid boot with studs, in particular a soccer or American football boot.

Manufacturers of sports articles are confronted with several challenges.

The articles must evolve towards being lighter in order to reduce as much as possible the energy spent during their use.

They must also enable the sportsperson to obtain the sensations required for movement control and rapidly transmit muscle impulses.

The rigidity of a part is directly linked to the elastic modulus of the constituent material of this part and to the cube of the thickness of the walls.

A material with a high modulus makes it possible to reduce part thicknesses and therefore to gain a great deal regarding the weight thereof while keeping the rigidity required for a good elastic return essential to the sportsperson.

In many sports articles, it is also necessary to guarantee good impact resistance (cold shock on a ski boot for example) and also good resistance to repeated stresses (bending of the sole of a football boot for example).

Moreover, the articles must be able to be easily injection-moulded and must make it possible to obtain parts which have an impeccable appearance and an ability to be coloured in varied colours.

PEBA copolymers belong to the specific class of polyetheresteramides when they result from the copolycondensation of polyamide blocks having reactive carboxylic ends with polyether blocks having reactive ends, which are polyether polyols (polyether diols), the bonds between the polyamide blocks and the polyether flexible blocks being ester bonds, or else to the class of polyetheramides when the polyether blocks have amine ends.

Various PEBAs are known for their physical properties, such as their flexibility, their impact strength, or the ease with which they are processed by injection-moulding.

Thus, in the prior art, CH655941 describes a PEBA blend, optionally comprising a polyamide, with a copolyolefin, the addition of which gives the blend compatibility and processability and also an improvement in flexibility and in cold impact strength.

U.S. Pat. No. 5,140,065 describes a composition comprising from 1-95% of at least one polyetherpolyamide block, from 1-95% of at least one polyether-esterpolyamide block, from 95-5% of at least one amorphous copolyamide and from 0.1% to 70% of at least one copolyolefin grafted with an unsaturated dicarboxylic acid. No application, in particular for manufacturing ski articles, is described.

FR198519421 describes blends of polyamides, PEBA and thermoplastic elastomers for injection-moulding, but does not mention any application.

US2005/0234215 relates to polyamide-PEBA copolymers, the molecular weight of the polyether part of the PEBA being in a range of from 200 to 40 000 g/mol, the applications of which are elastic fibres or products which have a "soft feel" to the hands and skin.

US2007/0179252 describes a composition comprising a transparent homo- or copolyamide, a polymer of which the Tg is below 80° C. and at least one photochromic dye, for preparing in particular photochromic lenses.

U.S. Pat. No. 4,218,549 relates to a composition comprising a polyamide homopolymer resulting from the condensation of lactams or of omega-amino carboxylic acids having at least 10 carbons, and a PEBA consisting of a polyamide resulting from the condensation of lactams or of omega-amino carboxylic acids having at least 10 carbons, of an alpha, omega-dihydroxy(polytetrahydrofuran) having a molecular weight between 160 and 3000 and of a dicarboxylic acid, for producing tubes.

US2013/0172484 describes a composition comprising from 10% to 50% by weight of an aliphatic polyamide, 1-10% by weight of a graft-modified ethylene-olefin elastomeric polymer, 1-10% by weight of a graft-modified propylene-olefin elastomeric copolymer, and 35-85% by weight of a PEBA having a Shore D of 50-60, as measured according to ASTM D2240.

Application WO 07/144531 relates to a transparent alloy comprising 1-99% by weight of a copolymer having a high transparency, comprising amide units comprising at least one cycloaliphatic unit and ether flexible units, and 99-1% of at least one polymer constituent chosen in particular from PEBAs and 0-50% by weight of another polyamide or copolyamide having an ether unit.

EP 1 482 011 describes a thermoplastic resin composition having an improved resistance to hydrolysis. Said composition is obtained by polymerisation of a polyether diamine triblock compound with a lactam or an amino acid.

The modification of polyamides with impact modifiers, including PEBAs, and also the mechanical reinforcement of PA with inorganic fillers, are therefore already described in the literature.

However, neither the obtaining of good reverse bending strength properties, nor the optimal rheological behaviour for the injection moulding of sports articles, is described.

Moreover, the addition of impact modifiers such as polyolefins, in particular grafted polyolefins, in particular polyolefins grafted with maleic anhydride, makes it possible to improve the impact level of polyamides, but in parallel very significantly increases the melt viscosity, thereby making the product difficult to injection-mould, especially for making thin parts.

The invention consists of the development of polyamide and PEBA blends which exhibit a compromise between rigidity, impact and reverse bending strength and which have a fluidity optimised for the injection-moulding of components of sports articles (soles, ski boot shells, rigid boots with studs, etc.).

The applicant has thus surprisingly discovered that the selection of specific PEBAs which are as soft as possible, i.e. which are sufficiently soft for impact reinforcement, but sufficiently compatible to limit phase separation and to obtain good adhesion with the matrix and to retain processability, in a blend with polyamides, where appropriate supplemented with inorganic fillers and/or with impact modifiers, allows the preparation of compositions which exhibit a good compromise between impact level, rigidity and processability for the injection-moulding of thin parts, in particular intended for the manufacture of sports articles, in particular of ski boots or of a part of a ski boot.

The present invention relates to a composition comprising, by weight, the total being equal to 100%:
(A) 50% to 95% of at least one semicrystalline polyamide of formula A/Z in which:
   A is an aliphatic repeating unit chosen from a unit obtained from the polycondensation of at least one amino acid and a unit obtained from the polycondensation of at least one lactam or a unit X.Y obtained from the polycondensation:
      of at least one diamine, said diamine being chosen from a linear or branched aliphatic diamine, a cycloaliphatic diamine and an aromatic diamine, or a mixture thereof, and
      of at least one dicarboxylic acid, said diacid being chosen from:
         an aliphatic diacid, a cycloaliphatic diacid and an aromatic diacid,
         said diamine and said diacid comprising from 4 to 36 carbon atoms, advantageously from 6 to 18 carbon atoms, and
   Z represents another polyamide and is included from 0 to 20%;
(B) 5% to 50% of at least one semicrystalline copolyamide comprising amide units (Ba1) and comprising polyether units (Ba2), having a glass transition temperature ($T_g$) below 75° C.,
said amide unit (Ba1) corresponding to an aliphatic repeating unit chosen from a unit obtained from at least one amino acid and a unit obtained from at least one lactam, or a unit X.Y obtained from the polycondensation:
   of at least one diamine, said diamine being chosen from a linear or branched aliphatic diamine and an aromatic diamine, or a mixture thereof, and
   of at least one dicarboxylic acid, said diacid being chosen from:
      an aliphatic diacid and an aromatic diacid,
      said diamine and said diacid comprising from 4 to 36 carbon atoms, advantageously from 6 to 18 carbon atoms;
said polyether units (Ba2) resulting in particular from at least one polyalkylene ether polyol, in particular one polyalkylene ether diol, the blend (A)+(B) having a flexural modulus included from 600 to less than 1000 MPa, in particular from 750 to less than 1000, as determined according to standard ISO 178:2010;
(C) 0% to 20% by weight of fibres and/or fillers,
(D) 0% to 20% of at least one impact modifier,
(E) 0% to 5% of at least one additive chosen from stabilisers, dyes, with the exception of a photochromic dye, and plasticisers, or a mixture thereof, for the manufacture of a sports article.

Throughout the description, all the percentages of (A), (B), (C), (D) and (E) are indicated by weight.

The term "polyamide" used in the present description also covers copolyamides, which may contain third monomers in a proportion that does not affect the essential qualities of the polyamides.

The term "semicrystalline" covers (co)polyamides which have both a glass transition temperature Tg and a melting point Mp determined respectively according to standard 11357-2:2013 and 11357-3:2013.

Tg: Inflection point at the second pass by DSC (DSC=differential scanning calorimetry)

Tg: glass transition temperature measured according to a DMA. It is the temperature given by the maximum of the peak of the tangent delta.

As Regards the Constituent (A):
A: Aliphatic Repeating Unit

In a first variant of the invention, the aliphatic repeating unit A is obtained from an aminocarboxylic acid comprising from 9 to 12 carbon atoms. It can thus be chosen from 9-aminononanoic acid (denoted 9), 10-aminodecanoic acid (denoted 10), 11-aminoundecanoic acid (denoted 11) and 12-aminododecanoic acid (denoted 12), the aminocarboxylic acid is advantageously 11-aminoundecanoic acid.

In a second variant of the invention, the aliphatic repeating unit A is obtained from a lactam comprising from 9 to 12 carbon atoms. It can thus be chosen from decanolactam (denoted 10), undecanolactam (denoted 11) and laurolactam or lauryllactam (denoted 12), the lactam is advantageously undecanolactam.

More particularly preferably, the repeating unit A is obtained from a single aminocarboxylic acid or from a single lactam.

However, it is entirely possible to envisage using, in order to obtain this same unit A, a mixture of two or more aminocarboxylic acids, a mixture of two or more lactams, but also a mixture of one, two or more aminocarboxylic acids with one, two or more lactams.

A: Repeating Unit X.Y

The repeating unit X.Y is a unit obtained from the polycondensation of at least one linear aliphatic diamine, or of at least one cycloaliphatic diamine or of at least one aromatic diamine or of a mixture of two or more thereof and of at least one aliphatic dicarboxylic acid or of at least one cycloaliphatic dicarboxylic acid or at least one aromatic dicarboxylic acid.

The molar proportions of diamine and of dicarboxylic acid are preferentially stoichiometric.

The diamine and also the dicarboxylic acid each comprise from 4 to 36 carbon atoms, and advantageously from 6 to 18 carbon atoms.

The aliphatic diamine used for obtaining this repeating unit X.Y is an aliphatic diamine which has a linear main chain comprising at least 4 carbon atoms.

This linear main chain may, where appropriate, comprise one or more methyl and/or ethyl substituents; in the latter configuration, the term used is "branched aliphatic diamine". In the case where the main chain comprises no substituent, the aliphatic diamine is termed a "linear aliphatic diamine". Whether or not it comprises methyl and/or ethyl substituents on the main chain, the aliphatic diamine used for obtaining this repeating unit X.Y comprises from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then corresponds to the formula $H_2N—(CH_2)_x—NH_2$ and may be chosen, for example, from butanediamine, pentanediamine, hexanediamine, heptanediamine, octanediamine, nonane-diamine, decanediamine, undecanediamine, dodecanediamine, tridecane-diamine, tetradecanediamine, hexadecanediamine, octadecanediamine and octadecenediamine. The linear aliphatic diamines which have just been mentioned may all be biobased within the meaning of standard ASTM D6866. When this diamine is a branched aliphatic diamine, it may in particular be 2-methylpentanediamine or 2-methyl-1,8-octanediamine.

The cycloaliphatic diamine may be chosen, for example, from bis(3,5-dialkyl-4-aminocyclohexyl)methane, bis(3,5- dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane or 3'-dimethyl-4,4'-diaminodicyclo-hexylmethane commonly called "BMACM" or "MACM" (and denoted B hereinafter), bis(p-aminocyclohexyl)methane commonly called "PACM" (and denoted P hereinafter), isopropylidenedi(cyclohexylamine) commonly called "PACP", isophoronediamine (denoted IPD hereinafter) and 2,6(-bis-(aminomethyl)norbornane commonly called "BAMN".

A nonexhaustive list of these cycloaliphatic diamines is given in the publication "Cycloaliphatic Amines" (Encyclopaedia of Chemical Technology, Kirk-Othmer, 4th Edition (1992), pp. 386-405).

The aromatic diamine may be chosen from 1,3-xylylenediamine and 1,4-xylylenediamine.

The dicarboxylic acid may be chosen from linear or branched aliphatic dicarboxylic acids, cycloaliphatic dicarboxylic acids and aromatic dicarboxylic acids.

When the dicarboxylic acid is aliphatic and linear, it may be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and dimers of fatty acids containing 36 carbons.

The dimers of fatty acids mentioned above are dimerised fatty acids obtained by oligomerisation or polymerisation of unsaturated monobasic fatty acids comprising a long hydrocarbon-based chain (such as linoleic acid and oleic acid), as described in particular in document EP 0 471 566.

When the dicarboxylic acid is cycloaliphatic, it may comprise the following carbon-based backbones: norbornylmethane, cyclohexane, cyclohexylmethane, dicyclohexylmethane, dicyclohexylpropane, di(methylcyclohexyl) or di(methyl-cyclohexyl)propane.

When the dicarboxylic acid is aromatic, it may be chosen from terephthalic acid (denoted T), isophthalic acid (denoted I) and a naphthelenic acid.

By way of example, the units X.Y are chosen from polybutylene adipamide (PA-4.6); polyhexamethylene adipamide (PA-6.6); polyhexamethylene azelamide (PA-6.9); polyhexamethylene sebacamide (PA-6.10); polyhexamethylene dodecanamide (PA-6.12); polydecamethylene dodecanamide (PA-10.12); polydecamethylene sebacanamide (PA-10.10) and polydodecamethylene dodecanamide (PA-12.12); advantageously, the unit X.Y represents polydecamethylene sebacanamide (PA-10.10).

Z: Other Polyamide

Z denotes another polyamide and may correspond to an aliphatic repeating unit or a unit X.Y as defined above, provided that it is different from A.

The proportion of Z present is from 0 to 20% by weight relative to the sum A+Z.

As Regards (B):

The copolymers (B) comprising amide units and polyether units result from the copolycondensation of polyamide blocks having reactive ends with polyether blocks having reactive ends, such as, inter alia:
1) Polyamide blocks having diamine chain ends with polyoxyalkylene blocks having dicarboxylic chain ends.
2) Polyamide blocks having dicarboxylic chain ends with polyoxyalkylene blocks having diamine chain ends obtained by cyanoethylation and hydrogenation of aliphatic alpha,omega-dihydroxylated polyoxyalkylene blocks called polyalkylene ether diols (polyether diols).
3) Polyamide blocks having dicarboxylic chain ends with polyether diols, the products obtained being, in this particular case, polyetheresteramides. The copolymers of the invention are advantageously of this type.

The polyamide blocks having dicarboxylic chain ends originate, for example, from the condensation of polyamide precursors in the presence of a chain-limiting dicarboxylic acid.

The polyamide blocks having diamine chain ends originate, for example, from the condensation of polyamide precursors in the presence of a chain-limiting diamine.

The polymers comprising polyamide blocks and polyether blocks may also comprise randomly distributed units. These polymers may be prepared by simultaneous reaction of the polyether and of the precursors of the polyamide blocks.

For example, polyether diol, polyamide precursors and a chain-limiting diacid may be reacted. A polymer is obtained which has essentially polyether blocks, and polyamide blocks of very variable length, but also the various reagents having reacted randomly which are randomly (statistically) distributed along the polymer chain.

Polyetherdiamine, polyamide precursors and a chain-limiting diacid may also be reacted. A polymer is obtained which has essentially polyether blocks and polyamide blocks of very variable length, but also various reagents having reacted randomly which are randomly (statistically) distributed along the polymer chain.

Amide Unit (Ba1):

The amide unit (Ba1) corresponds to an aliphatic repeating unit as defined above for the repeating unit A, with the exclusion of the diamine in the case where A is a unit X.Y which cannot correspond to a cycloaliphatic diamine. Advantageously, (Ba1) represents 11-aminoundecanoic acid or undecanolactam.

Polyether Unit (Ba2):

The polyether units result especially from at least one polyalkylene ether polyol, they in particular result from at least one polyalkylene ether polyol, in other words, the polyether units consist of at least one polyalkylene ether polyol. In this embodiment, the expression "of at least one polyalkylene ether polyol" means that the polyether units consist exclusively of alcohol chain ends and cannot therefore be a compound of polyetherdiamine triblock type.

The composition of the invention is therefore devoid of polyetherdiamine triblock.

The number-average molecular weight of the polyether blocks is advantageously included from 200 to 4000 g/mol, preferably from 250 to 2500 g/mol, in particular from 300 to 1100 g/mol.

The copolyamide (B) can be prepared by means of the following process in which:
 in a first step, the polyamide blocks (Ba1) are prepared by polycondensation
  of the diamine(s);
  of the dicarboxylic acid(s); and
 where appropriate, of the comonomer(s) chosen from lactams and alpha-omega-amino carboxylic acids;
  in the presence of a chain limiter chosen from dicarboxylic acids; then
 in a second step, the polyamide blocks (Ba1) obtained are reacted with polyether blocks (Ba2), in the presence of a catalyst.

The general two-step method for preparing the copolymers of the invention is known and is described, for example, in French patent FR 2 846 332 and in European patent EP 1 482 011.

The reaction for forming the block (Ba1) is generally carried out at between 180 and 300° C., preferably from 200 to 290° C., the pressure in the reactor settles at between 5 and 30 bar, and is maintained for approximately 2 to 3 hours. The pressure is slowly reduced by placing the reactor at atmospheric pressure, and then the excess water is distilled off for example for one or two hours.

Once the polyamide having carboxylic acid ends has been prepared, the polyether and a catalyst are then added. The polyether can be added in one or more steps, likewise for the catalyst. According to one advantageous form, the polyether is added first, and the reaction of the OH ends of the polyether and of the COOH ends of the polyamide begins with formation of ester bonds and removal of water. As much water as possible is removed from the reaction medium by distillation, and then the catalyst is introduced in order to complete the bonding of the polyamide blocks and of the polyether blocks. This second step is carried out with stirring, preferably under a vacuum of at least 15 mmHg (2000 Pa) at a temperature such that the reagents and the copolymers obtained are in the molten state. By way of example, this temperature may be between 100 and 400° C. and usually 200 and 300° C. The reaction is monitored by measuring the torque exerted by the molten polymer on the stirrer or by measuring the electrical power consumed by the stirrer. The end of the reaction is determined by the target torque or power value.

It will also be possible to add, during the synthesis, at the moment judged to be the most opportune, one or more molecules used as antioxidant, for example Irganox® 1010 or Irganox® 245.

It is also possible to consider the process for preparing copolyamide (B) such that all the monomers are added at the beginning, that is to say in a single step, so as to carry out the polycondensation:
  of the diamine(s);
  of the dicarboxylic acid(s); and
  where appropriate, of the other polyamide comonomer(s);
  in the presence of a chain limiter chosen from dicarboxylic acids;
  in the presence of the blocks (Ba2) (polyether);
  in the presence of a catalyst for the reaction between the flexible blocks (Ba2) and the blocks (Ba1).

Advantageously, said dicarboxylic acid, which is introduced in excess relative to the stoichiometry of the diamine (s), is used as chain limiter.

Advantageously, a derivative of a metal chosen from the group made up of titanium, zirconium and hafnium, or a strong acid such as phosphoric acid, hypophosphorous acid or boric acid, is used as catalyst.

The polycondensation can be carried out at a temperature of 240 to 280° C. Generally, the copolymers comprising ether and amide units that are known consist of semicrystalline linear aliphatic polyamide blocks (for example the "Pebax" products from Arkema).

The blend (A)+(B) has a flexural modulus included from 600 to less than 1000 MPa, in particular from 750 to less than 1000, determined according to standard ISO 178:2010, which confers on the composition of the invention a good flexibility-rigidity compromise.

Advantageously, (B) also has a Shore D hardness included from 35 to 55, in particular from 37 to 47, measured according to ISO 868:2003.

This Shore D hardness corresponds to an instantaneous hardness.

As Regards (C):

The composition of the invention may comprise from 0 to 20% of fibres and/or fillers.

By way of example, the fibres may be chosen from aramid fibres, glass fibres or carbon fibres, advantageously glass fibres or carbon fibres.

By way of example, the fillers may be chosen from silica, graphite, expanded graphite, carbon black, glass beads, kaolin, magnesia, slag, talc, wollastonite, nanofillers (carbon nanotubes), pigments, metal oxides (titanium oxide) and metals, advantageously wollastonite and talc, preferentially talc.

As Regards (D):

The composition of the invention may comprise from 0 to 20% of an impact modifier which, by way of example, is chosen from functionalised or non-functionalised polyolefins. Advantageously, the polyolefin is an elastomeric copolymer of ethylene and of a polyolefin or an elastomeric copolymer of ethylene and of propylene which is functionalised or non-functionalised.

The elastomeric copolymer of ethylene and of polyolefin may comprise from 5% to 45% by weight, advantageously from 15% to 40% by weight, advantageously from 25-35% by weight of copolymer of one or more $C_4$ to $C_{10}$ olefins (for example 1- or 2-butene, pentene, 1- or 2-hexene, 1- or 2-heptene and 1- or 2-octene, the rest (remainder to 100% by weight) corresponding to the ethylene copolymer. Advantageously, the elastomeric copolymer of ethylene and of polyolefin is chosen from an ethylene/butylene copolymer and an ethylene/-octene copolymer grafted with maleic anhydride.

The elastomeric copolymer of ethylene and of polypropylene may comprise from 22% to 60% by weight, advantageously from 22% to 55% by weight, advantageously 25-55% by weight of propylene copolymer, the rest (remainder to 100% by weight) corresponding to the ethylene copolymer. Said elastomeric copolymer of ethylene and of polypropylene may comprise in addition at least one $C_5$ to $C_{10}$ non-conjugated diene copolymer, such as, for example, 1,4-pentadiene; 1,4- and 1,5-hexadiene; 1,4- and 1,5-heptadiene; or 1,4- and 1,5-octadiene.

Advantageously, said copolymer is an ethylene/propylene copolymer (EPR) or an ethylene-propylene-diene monomer (EPDM) which can be grafted with maleic anhydride.

Advantageously, the composition of the invention is devoid of impact modifier.

As Regards (E):

The composition of the invention may comprise an additive chosen from stabilisers, dyes, with the exception of a photochromatic dye, and plasticisers. By way of example, the stabiliser may be a UV-stabiliser, an organic stabiliser or more generally a combination of organic stabilisers, such as an antioxidant of phenol type (for example of the type of that of Irganox 245 or 1098 or 1010 from the company Ciba-BASF), an antioxidant of phosphite type (for example Irgaphos® 126 from the company Ciba-BASF) and even optionally other stabilisers, such as HALS, which means Hindered Amine Light Stabiliser (for example Tinuvin 770 from the company Ciba-BASF), an anti-UV agent (for example Tinuvin 312 from the company Ciba), or a phosphorous-based stabiliser. Use may also be made of antioxidants of amine type, such as Naugard 445 from the company Crompton or else polyfunctional stabilisers such as Nylostab S-EED from the company Clariant.

This stabiliser may also be an inorganic stabiliser, such as a copper-based stabiliser. By way of example of such inorganic stabilisers, mention may be made of copper halides and acetates. Secondarily, other metals, such as silver, may optionally be considered, but said metals are known to be less effective. These copper-based compounds are typically combined with alkali metal halides, in particular potassium halides.

A photochromatic dye is a dye which is reversibly excitable by UV rays or by short wavelengths in the visible range, i.e. a dye which can be excited in a state in which its absorption spectrum is modified in such a way that the absorption of visible light takes place.

The composition of the invention is devoid of photochromatic dye.

By way of example, the plasticisers are chosen from benzenesulphonamide derivatives, such as n-butyl benzenesulphonamide (BBSA); ethyl toluene sulphonamide or N-cyclohexyl toluene sulphonamide; hydroxybenzoic acid esters, such as 2-ethylhexyl para-hydroxybenzoate and 2-decylhexyl para-hydroxybenzoate; esters or ethers of tetrahydrofurfuryl alcohol, for instance oligoethyleneoxytetrahydrofurfuryl alcohol; and esters of citric acid or of hydroxymalonic acid, such as oligoethyleneoxy malonate.

The use of a mixture of plasticisers would not be a departure from the context of the invention.

The composition described makes it possible to obtain thin parts by injection-moulding which exhibit a compromise between properties of rigidity/elastic return/fatigue resistance/impact strength/injectability/ability to be decorated which is ideal for producing sports articles, in particular ski boots or rigid boots with studs, in particular for soccer or American football.

Advantageously, the composition as defined above is substantially devoid of transparency.

The expression "substantially devoid of transparency" means that the composition has a transparency such that the transmittance at 560 nm on a sheet 2 mm thick is less than 70%, determined in accordance with standard ISO 13468-2; 2006.

Advantageously, in the composition of the invention, the copolyamide (B) has a crystallinity such that the enthalpy of fusion during the second heating of an ISO DSC (delta Hm(2)) is at least equal to 25 J/g, the weight being relative to the amount of amide units contained or of polyamide contained, this melting corresponding to that of the amide units.

The enthalpy of fusion is determined according to standard 11357-3:2013. Advantageously, in the composition of the invention, the amide units (Ba1) represent at least 50% by weight of the copolyamide (B).

Advantageously, in the composition of the invention, the polyether units (Ba2) represent at least 15% by weight of the copolyamide (B).

It would not be a departure from the context of the invention if the copolyamide (B) comprised in addition another polymer in a proportion by weight of 0 to 20%. By way of example, the other polymer may be a polyester.

Advantageously, said polyether units (Ba2) are chosen from polyethylene glycol (PEG), polypropylene glycol (PPG), polytrimethylene glycol (PO3G), polytetramethylene glycol (PTMG) and mixtures thereof or copolymers thereof, in particular PTMG.

Advantageously, the polyamide (A) of the composition of the invention is present at from 65% to 95% by weight, in particular from 65% to 85% by weight, especially from 75% to 85% by weight.

Advantageously, the copolyamide (B) of the composition is present at from 5% to 35%, especially from 5% to 30%, in particular from 5% to 20%, in particular from 5% to 15%.

Advantageously, the polyamide (A) of the composition of the invention is present at from 65% to 95% by weight, in particular from 65% to 85% by weight, especially from 75% to 85% by weight, and the copolyamide (B) of the composition is present at from 5% to 35%, especially from 5% to 30%, in particular from 5% to 20%, in particular from 5% to 15%.

According to another variant of the invention, the composition of the invention comprises:
(A) 50% to 95%,
(B) 5% to 50%,
(E) 0% to 5%,
the sum A+B E being equal to 100%.

Advantageously, in this composition comprising (A), (B) and optionally (E), the polyamide (A) of the composition of the invention is present at from 65% to 95% by weight, in particular from 65% to 85% by weight, especially from 75% to 85% by weight.

Advantageously, in this composition comprising (A), (B) and optionally (E), the copolyamide (B) of the composition is present at from 5% to 35%, especially from 5% to 30%, in particular from 5% to 20%, in particular from 5% to 15%.

Advantageously, in this composition comprising (A), (B) and optionally (E), the polyamide (A) of the composition of the invention is present at from 65% to 95% by weight, in particular from 65% to 85% by weight, especially from 75% to 85% by weight, and the copolyamide (B) of the composition is present at from 5% to 35%, especially from 5% to 30%, in particular from 5% to 20%, in particular from 5% to 15%.

In this variant, the composition of the invention is devoid of impact modifier and of fibres and/or fillers and therefore consists very predominantly of a blend (A)+(B) which has a flexural modulus included from 600 to less than 1000 MPa, in particular from 750 to less than 1000 (standard ISO 178:2010), which allows this composition of the invention to exhibit an improved impact/processability/rigidity compromise and also an ability to be decorated that is suitable for use for a sports article corresponding in particular to a ski boot.

Advantageously, the polyamide (A) and/or the polyamide (Ba1) of this composition devoid of impact modifier and of fibres and/or fillers is chosen from PA11 and PA12, in particular PA11 Advantageously, the polyamide (A) and/or the polyamide (Ba1) is (are) of biobased origin, i.e. it may comprise monomers originating from resources derived from renewable raw materials, i.e. comprising organic carbon derived from biomass and determined according to standard ASTM D6866. These monomers derived from renewable raw materials may be in particular 11-aminoundecanoic acid, and the linear aliphatic diamines and diacids as defined above. Advantageously, the percentage of monomers originating from resources derived from renewable raw materials is at least 90%.

According to another variant of the invention, the composition of the invention comprises:
(A) 50% to 95%,
(B) 5% to 50%,
(D) 0.1% to 10%,
(E) 0% to 5%,
the sum A+B+D+E being equal to 100%.

Advantageously, in this composition comprising (A), (B), (D) and optionally (E), the polyamide (A) of the composition of the invention is present at from 65% to 95% by weight, in particular from 65% to 85% by weight, especially from 75% to 85% by weight.

Advantageously, in this composition comprising (A), (B), (D) and optionally (E), the copolyamide (B) of the composition is present at from 5% to 35%, especially from 5% to 30%, in particular from 5% to 20%, in particular from 5% to 15%. Advantageously, in this composition comprising (A), (B), (D) and optionally (E), the polyamide (A) of the composition of the invention is present at from 65% to 95% by weight, in particular from 65% to 85% by weight, especially from 75% to 85% by weight, and the copolyamide (B) of the composition is present at from 5% to 35%, especially from 5% to 30%, in particular from 5% to 20%, in particular from 5% to 15%.

In this variant, the composition of the invention is devoid of fibres and/or fillers and therefore consists very predominantly of a blend (A)+(B) which also comprises impact modifiers, thereby allowing this composition of the invention to exhibit an impact strength which is greater than the composition devoid of impact modifier and of fibres and/or fillers, but also suitable for use for a sports article corresponding in particular to a ski boot.

Advantageously, the polyamide (A) and/or the polyamide (Ba1) of this composition devoid of impact modifier and of fibres and/or fillers is chosen from PA11 and PA12, in particular PA11. Advantageously, the polyamide (A) and/or the polyamide (Ba1) is (are) of biobased origin, i.e. it may comprise monomers originating from resources derived from renewable raw materials, i.e. comprising organic carbon derived from biomass and determined according to standard ASTM D6866. These monomers derived from renewable raw materials may be in particular 11-aminoundecanoic acid, and the linear aliphatic diamines and diacids as defined above. Advantageously, the percentage of monomers originating from resources derived from renewable raw materials is at least 90%.

According to another variant of the invention, the composition of the invention comprises:
- (A) 50% to 95%,
- (B) 5% to 50%,
- (C) 2% to 10%, especially 5% to 10%, in particular 2% to 7%,
- (E) 0% to 5%, the sum A+B+C+E being equal to 100%.

In this variant, the composition of the invention is devoid of impact modifier and therefore consists very predominantly of a blend (A)+(B) which comprises fibres and/or fillers and optionally additives.

Advantageously, the fibres are in particular glass fibres or carbon fibres, thereby allowing this composition of the invention to exhibit an improved impact/processability/rigidity compromise compared with a composition comprising a polyamide such as PA11 and glass fibres or carbon fibres, but devoid of PEBA and impact modifier. This composition is then suitable for use for a sports article corresponding in particular to a more rigid boot, such as a rigid boot with studs, in particular for soccer or American football.

Advantageously, in this composition comprising (A), (B), (C) and optionally (E), the polyamide (A) of the composition of the invention is present at from 65% to 95% by weight, in particular from 65% to 85% by weight, especially from 75% to 85% by weight.

Advantageously, in this composition comprising (A), (B), (C) and optionally (E), the polyamide (B) of the composition is present at from 5% to 35% by weight, especially from 5% to 30%, in particular from 5% to 20%, in particular from 5% to 15%.

Advantageously, in this composition comprising (A), (B), (C) and optionally (E), the polyamide (A) of the composition of the invention is present at from 65% to 95% by weight, in particular from 65% to 85% by weight, especially from 75% to 85% by weight, and the copolyamide (B) of the composition is present at from 5% to 35%, especially from 5% to 30%, in particular from 5% to 20%, in particular from 5% to 15%.

Advantageously, the composition of the invention devoid of impact modifier and comprising fibres such as glass fibres or carbon fibres has a flexural modulus included from 1400 to 2100 MPa, in particular from 1600 to 2100 MPa, as determined according to standard ISO 178:2010. Advantageously, said composition comprises from 5% to 10% by weight of glass fibres or from 2% to 7% by weight of carbon fibres.

Advantageously, the polyamide (A) and/or the polyamide (Ba1) of this composition devoid of impact modifier and comprising fibres such as glass fibres or carbon fibres is chosen from PA11 and PA12, in particular PA11. Advantageously, the polyamide (A) and/or the polyamide (Ba1) is (are) of biobased origin, i.e. it may comprise monomers originating from resources derived from renewable raw materials, i.e. comprising organic carbon derived from biomass and determined according to standard ASTM D6866. These monomers derived from renewable raw materials can be in particular 11-aminoundecanoic acid, and the linear aliphatic diamines and diacids as defined above. Advantageously, the percentage of monomers originating from resources derived from renewable raw materials is at least 90%.

Alternatively, said additives of this composition devoid of impact modifier may be fillers, in particular wollastonite and/or talc, thereby allowing this composition of the invention to exhibit properties of a material that is ductile at −10° C., said composition then being suitable for use for a sports article corresponding in particular to a more rigid boot such as a rigid boot with studs, in particular for soccer or American football. Advantageously, said composition of the invention devoid of impact modifier and comprising fillers such as wollastonite and/or talc has a flexural modulus included from 1400 to 2100 MPa, in particular from 1600 to 2100 MPa, as determined according to standard ISO 178:2010.

Advantageously, the polyamide (A) of this composition devoid of impact modifier and comprising fillers is chosen from PA-4.6; PA-6.6; PA-6.9; PA-6.10; PA-6.12; PA-10.12; PA-10.10 and PA-12.12, advantageously PA-10.10, and/or the polyamide (Ba1) is chosen from PA11 and PA12, in particular PA11. Advantageously, the polyamide (A) and/or the polyamide (Ba1) is (are) of biobased origin, i.e. it may comprise monomers originating from resources derived from renewable raw materials, i.e. comprising organic carbon derived from biomass and determined according to standard ASTM D6866. These monomers derived from renewable raw materials can be in particular 11-aminoundecanoic acid, and the linear aliphatic diamines and diacids as defined above. Advantageously, the percentage of monomers originating from resources derived from renewable raw materials is at least 90%.

According to another aspect, the present invention relates to the use of a composition as defined above, for the manufacture of a sports article, in particular a ski boot or a rigid boot with studs, such as a soccer or American football boot.

According to yet another aspect, the present invention relates to a process for preparing a composition as defined above, comprising a step of mixing the constituents (A), (B) and, where appropriate, (C) to (E) in the molten state, in particular in an extruder, at a temperature between 230 and 330° C., and the recovery thereof in the form of granules, which granules will subsequently be injected, at a temperature between 230 and 330° C., onto an injection-moulding machine so as to obtain the desired articles.

According to yet another aspect, the present invention relates to a process for preparing a composition as defined above, comprising a step of mixing the constituents (A), (B) and, where appropriate, the constituents (C) to (E), which are in the form of granules, this mixture then being injected, at a temperature of between 230 and 330° C., onto an injection-moulding machine so as to obtain the desired articles.

The invention also relates to a fashioned article, such as a fibre, fabric, film, sheet, rod, tube or injection-moulded part, in particular substantially devoid of transparency, comprising the composition as defined above, which can be produced in the form of a dry mixture or after compounding on an extruder.

Advantageously, the article defined above consists of a sports article, in particular a ski boot or a part of a ski boot or a rigid boot with studs, such as a soccer or American football boot.

EXAMPLES

Example 1

PA/PEBA Blends

Composition of the Invention:
(A) PA11: 84.7% (biobased)
(B) PA11/PTMG 1000 (50/50): 15% (biobased)
Additives: antioxidants Irganox® 245 and Irgafos®126.

Table 1 presents the values obtained regarding 6 principal criteria required for the manufacture of a sports article.

TABLE 1

| type | name or composition | Invention1 | Comp C1 | Comp C2 | Comp C3 | Comp C4 |
|---|---|---|---|---|---|---|
| PA11 | | 84.7 | | | | |
| Pebax | 95.2% PA12(5000) + 4.8% PTMG (250) | | 100 | | | |
| Pebax | 95.7% PA11 (5600) + 4.3% PTMG (250) | | | 100 | | |
| PA12 | | | | | | |
| Pebax | 50% PA11 (1000) + 50% PTMG (1000) | 15 | | | | |
| stabiliser | Irgafos ® 126 | 0.2 | | | | |
| stabiliser | Irganox ® 245 | 0.1 | | | | |
| flexural modulus | ISO 178: 2010 | 850 | *513* | *560* | 710 | 710 |
| Ross Flex | 150 000 cycles | no breakage | no breakage | no breakage | no breakage | no breakage |
| multiaxial impact 23° C . notched | ISO 6603-2 | ductile | ductile | ductile | ductile | ductile |
| Charpy impact (−30° C.) | ISO 179-1: 2010 | 16 | *10* | 16 | 75 | 40 |
| flow length | (900 b, 260° C., 2 mm) | 420 mm | | | | *175 mm* |
| aesthetics/coloration | | good | good | good | *medium* | *medium* |
| % renewable material | | >90% | *0%* | >90% | *0%* | *0%* |

The various PEBAX products are sold by the company Arkema. The number between parentheses indicates the average molecular weight of the polyamide and of the polyether.

Irgaphos ® 126 is a phosphite-based antioxidant sold by Ciba-BASF.

Irganox ® 245 is a phenol-type antioxidant.

Comp C1 = Comparative composition C1: PA12 (not biobased)

Comp C2 = Comparative composition C2: PA11 (biobased)

Comp C3 = Comparative composition C3: Grilamid L25ANZ ® (PA12 not biobased) sold by the company EMS. It corresponds to a blend of PA12 and polyolefins and is customarily used for the manufacture of ski boots. The introduction of polyolefins as impact modifier gives the composition a matt appearance and a more viscous aspect that is difficult to colour.

Comp C4 = Comparative composition C4: Grilamid XE4158 ® (PA12 not biobased) sold by the company EMS. It has the characteristic of being more fluid than composition C3.

The values in italics indicate properties that are insufficient for the manufacture of sports articles.

Compositions C1 to C4 exhibit either a modulus that is too low, or a charpy impact that is too low or a flow length value that is too low for the manufacture of such articles.

Only the composition of the invention exhibits good values with regard to the 6 criteria retained. The introduction of PEBA will counterbalance the disadvantages of the polyolefins by making it possible to fluidify the composition and to make it easier to colour.

Moreover, the composition of the invention 1 also exhibits a ductile nature in multiaxial impact at −20° C.

Example 2

Mixtures of PA/PEBA and Additives

The properties of compositions of the invention: PA 10.10 or PA11 in the presence of additives such as fibres or fillers, in comparison with comparative compositions, are presented in Table 2:

TABLE 2

| type | name or composition | Invention 1 | Invention 2 | Invention 3 | comp C1 | comp C2 | comp C3 | comp C4 | comp C5 |
|---|---|---|---|---|---|---|---|---|---|
| PA10.10 | | 84.3 | 84.3 | | 93.7 | 92 | 93.7 | 91.7 | |
| PA11 | | | | 77.9 | | | | | 91.7 |
| Talc | Jetfine 3CA | 7.4 | | | 6 | 8 | | | |
| Pebax | PA11/PTMG 1000/1000 (50/50) | 8 | 8 | 15 | | | | | |
| Glass fibre | Asahi CSX 3J451S | | | 6.8 | | | | | 8 |
| wollastonite | Nyglos 8 | | 7.4 | | | | 6 | 8 | |
| wollastonite | Tremin 939 | | | | | | | | |
| stabiliser | NaHPO$_2$ | 0.2 | 0.2 | 0.2 | 0.2 | 0.2 | 0.2 | 0.2 | 0.2 |
| stabiliser | Irganox 245 | 0.1 | 0.1 | 0.1 | 0.1 | 0.1 | 0.1 | 0.1 | 0.1 |
| flexural modulus | ISO 178: 2010 | 1747 | 1607 | 1464 | 1873 | 2073 | 1784 | 1941 | 1908 |
| Ross Flex | 150 000 cycles | no breakage | no breakage | no breakage | 60% breakage | 60% breakage | 60% breakage | 100% breakage | no breakage |
| multiaxial impact 23° C. | ISO 6603-2 | ductile | ductile | ductile | ductile | ductile | ductile | ductile | *brittle* |
| flow length | | 434 | 488 | 329 | 366 | 389 | 490 | 474 | 398 |

PA 10.10 and PA11 are sold by the company Arkema.
Jetfine 3CA is sold by the company Imerys.
Asahi CSX 3J451S is sold by the company Asahi Kasei Incorporation.
Nyglos 8 ® is sold by the company Nyco Minerals Incorporation.
Tremin ® 939 is sold by the company Quartzwerke.
The values in italics indicate properties that are insufficient for the manufacture of sports articles.

The compositions of the invention 1 and 2 exhibit superior characteristics (in particular in terms of Ross flex and of multiaxial impact at 23° C., with additives such as fillers (talc and wollastonite respectively)) compared with the composition of the invention 3 consisting of PA11, PEBA and glass fibres, which itself exhibits superior characteristics compared with comparative composition C5 consisting of PA11 and glass fibres (without PEBA).

Moreover, the composition of the invention 1 also has a ductile nature in multiaxial impact at −10° C.

The invention claimed is:

1. A composition comprising, by weight, the total being equal to 100%:
   (A) 75% to 95% of at least one semicrystalline polyamide of formula A/Z in which:
      A is a polyamide with an aliphatic repeating unit chosen from
         a unit obtained from the polycondensation of at least one amino acid,
         a unit obtained from the polycondensation of at least one lactam, or
         a unit X.Y obtained from the polycondensation:
            of at least one diamine, said diamine being chosen from a linear or branched aliphatic diamine, a cycloaliphatic diamines, and an aromatic diamine, and
            of at least one dicarboxylic acid, said diacid being chosen from:
               an aliphatic diacid, a cycloaliphatic diacid and an aromatic diacid, said diamine and said diacid comprising from 4 to 36 carbon atoms, and
      Z represents a polyamide different than A and is included from 0 to 20%;
   (B) 5% to 25% of at least one semicrystalline copolyamide comprising amide units (Ba1) and comprising polyether units (Ba2), having a glass transition temperature ($T_g$) below 75° C.,
   said amide unit (Ba1) corresponding to an aliphatic repeating unit chosen from
      a unit obtained from at least one amino acid,
      a unit obtained from at least one lactam, or
      a unit X.Y obtained from the polycondensation:
         of at least one diamine, said diamine being chosen from a linear or branched aliphatic diamine and an aromatic diamine, and
         of at least one dicarboxylic acid, said diacid being chosen from:
            an aliphatic diacid and an aromatic diacid,
            said diamine and said diacid comprising from 4 to 36 carbon atoms;
   said polyether units (Ba2) resulting from at least one polyalkylene ether polyol,
   the blend (A) +(B) having a flexural modulus included from 600 to less than 1000 MPa, as determined according to standard ISO 178:2010;
   (C) 0% to 20% by weight of fibres and/or fillers,
   (D) 0% to 20% of at least one impact modifier,
   (E) 0% to 5% of at least one additive chosen from stabilisers, dyes, with the exception of a photochromic dye, and plasticisers,
   for the manufacture of a sports article.

2. The composition according to claim 1, wherein said composition is substantially devoid of transparency.

3. The composition according to claim 1, wherein the copolyamide (B) has a crystallinity such that the enthalpy of fusion during the second heating in an ISO DSC (delta Hm(2)) is at least equal to 25 J/g, the weight of copolyamide (B) being relative to the amount of amide units contained or of polyamide contained, this melting corresponding to that of the amide units.

4. The composition according to claim 1, wherein the amide units (Ba1) represent at least 50% by weight of the copolyamide (B).

5. The composition according to claim 1, wherein the polyether units (Ba2) represent at least 15% by weight of the copolyamide (B).

6. The composition according to claim 1, wherein the polyether units (Ba2) are chosen from polyethylene glycol (PEG), polypropylene glycol (PPG), polytrimethylene glycol (PO3G), polytetramethylene glycol (PTMG) and mixtures thereof or copolymers thereof.

7. The composition according to claim 1, comprising:
(A) 75% to 95%,
(B) 5% to 25%, and
(E) 0% to 5%,
wherein the sum A +B +E being equal to 100%.

8. The composition according to claim 7, wherein the sports article is a ski boot or a part of a ski boot.

9. The composition according to claim 1, comprising:
(A) 75% to 95%,
(B) 5% to 25%,
(D) 0.1% to 10%, and
(E) 0% to 5%,
wherein the sum A +B +D +E being equal to 100%.

10. The composition according to claim 1, comprising:
(A) 75% to 95%,
(B) 5% to 25%,
(C) 2% to 10%, and
(E) 0% to 5%,
wherein the sum A +B +C +E being equal to 100%.

11. The composition according to claim 10, comprising fibres (C).

12. The composition according to claim 10, wherein the sports article is a rigid boot with studs.

13. The composition according to claim 10, comprising fillers (C).

14. The composition according to claim 13, wherein the polyamide (A) is chosen from PA-4.6; PA-6.6; PA-6.9; PA-6.10; PA-6.12; PA-10.12; PA-10.10 and PA-12.12, and/or the amide Ba1 is chosen from PA11 and PA12.

15. The composition according to claim 10, wherein the composition has a flexural modulus included from 1400 to 2100 MPa, as determined according to standard ISO 178: 2010.

16. The composition according to claim 1, wherein the polyamide (A) and/or the amide (Ba1) is chosen from PA11 and PA12.

17. The composition according to claim 16, wherein the polyamide (A) and/or the amide (Ba1) is (are) biobased.

18. A method of manufacturing a sports article, the method comprising utilizing a composition as defined in claim 1, for the manufacture of a sports article.

19. A process for preparing a composition as defined in claim 1, comprising a step of mixing the constituents (A), (B) and, where appropriate, (C) to (E) in the molten state, at a temperature of from 230 to 330° C., and the recovery thereof in the form of granules, which granules will subsequently be injected, at a temperature of from 230 to 330° C., onto an injection-moulding machine.

20. A process for preparing a composition as defined in claim 1, comprising a step of mixing the constituents (A), (B) and, where appropriate, the constituents (C) to (E), which are in the form of granules, this mixture then being injected, at a temperature of from 230 to 330° C., onto an injection-moulding machine.

21. A fashioned article comprising the composition as defined in claim 1, wherein the fashioned article comprises a fibre, fabric, film, sheet, rod, tube or injection-moulded part.

22. The fashioned according to claim 21, wherein the fashioned article consists of a sports article.

* * * * *